(12) United States Patent
Dickens et al.

(10) Patent No.: US 6,618,774 B1
(45) Date of Patent: Sep. 9, 2003

(54) COMPUTER SIGNAL TRANSMISSION SYSTEM

(75) Inventors: Adrian Christopher Dickens, Swaffham Bulbeck (GB); Nigel Anthony Dickens, Swaffham Bulbeck (GB); Philip Edward Hudson, Great Gransden (GB)

(73) Assignee: Adder Technology Ltd., Cambridge (GB)

( * ) Notice: Subject to any disclaimer, the term of this patent is extended or adjusted under 35 U.S.C. 154(b) by 0 days.

(21) Appl. No.: 09/527,067

(22) Filed: Mar. 16, 2000

(30) Foreign Application Priority Data

Mar. 17, 1999 (GB) ................................................ 9906052
Sep. 16, 1999 (GB) ................................................ 9921780

(51) Int. Cl.[7] ................................................ G06F 13/12
(52) U.S. Cl. ............................ 710/64; 710/72; 725/40; 174/19; 174/27
(58) Field of Search ................................ 710/1, 15, 20, 710/39, 51, 72, 107, 63, 64, 126, 128, 17, 38, 62; 455/3.1; 348/7; 725/51, 40; 345/327; 174/19, 27

(56) References Cited

U.S. PATENT DOCUMENTS

| 5,130,793 A | 7/1992 | Bordry et al. |
| 5,479,617 A | 12/1995 | Nei |
| 5,528,286 A | 6/1996 | Goolcharan |
| 5,818,948 A | * 10/1998 | Gulick .......................... 381/78 |
| 6,038,425 A | * 3/2000 | Jeffrey ......................... 455/3.1 |
| 6,067,589 A | * 5/2000 | Mamata ........................ 710/63 |
| 6,188,428 B1 | * 2/2001 | Koz et al. ....................... 348/7 |
| 6,212,584 B1 | * 4/2001 | Nei ............................... 710/72 |
| 6,219,839 B1 | * 4/2001 | Sampsell ..................... 725/40 |
| 6,385,666 B1 | * 5/2002 | Thornton et al. ............... 710/2 |
| 6,408,351 B1 | * 6/2002 | Hamdi et al. ................ 710/63 |

FOREIGN PATENT DOCUMENTS

| EP | 0587367 A1 | 3/1994 |
| EP | 0617560 A1 | 9/1994 |
| EP | 0798923 A2 | 10/1997 |
| WO | WO94/30012 | 12/1994 |
| WO | WO96/17474 | 6/1996 |
| WO | WO96/21986 | 7/1996 |
| WO | WO98/54901 | 12/1998 |

* cited by examiner

Primary Examiner—Jeffrey Gaffin
Assistant Examiner—Rijue Mai
(74) Attorney, Agent, or Firm—Beyer Weaver & Thomas, LLP

(57) ABSTRACT

A system for transmitting electrical signals between a computer and peripherals along a twisted pair cable. The system includes a computer interface, a peripheral interface and a twisted pair cable in communication between the computer interface and the peripheral interface. Video and audio signals from the computer are transmitted via the twisted pair cable to the peripherals. Peripheral signals can also be communicated between the computer and peripherals via the twisted pair cable.

28 Claims, 6 Drawing Sheets

COMPUTER SIGNAL TRANSMISSION SYSTEM

The present invention relates to a computer signal transmission system, and in particular to a system for transmitting a group of analogue and digital signals between a computer and peripheral devices using a twisted pair data cable.

For convenience, operational and security reasons it is often desirable to locate video screens some distance away from the device that is generating the video signal. If a cable is used to transfer the signal between the source and screen then the quality of the resulting video picture will depend upon the type and length of the cable used. As the cable length is increased the quality of the picture will degrade. To maintain reasonable video quality. coaxial cable is commonly used.

In many practical applications, video information is generated by personal computers. These personal computers typically output their video as red, green and blue (RGB) analogue signals together with horizontal and vertical picture synchronisation signals. This type of video signal can usually be successfully transmitted over several meters using multi-core cable that includes three coaxial cores for the red, green and blue signals and other wires for each of the horizontal and vertical synchronisation signals. This 'tri-coax' (three coaxial core) cable is typically used for personal computer monitor leads. Such cable performs well when used over short distances but has several disadvantages when longer cable runs are required. 'Tri-coax' cable is relatively bulky, stiff and costly and typical PC video signals start to noticeably fade and smudge when transmitted over distances of 'tri-coax' cable exceeding about 30 meters. The smudging effect becomes worse as the frequency of the video signal increases (for example when setting a higher screen resolution on a personal computer).

Twisted pair data cable is popular for use in computer networks and other data communications applications and consequently is commonly installed within the structure of buildings. This cable is cheaper, lighter and more flexible than 'tri-coax' cable and can consequently be installed more easily. There are therefore cost and convenience advantages in using twisted pair data cable to carry RGB video.

There are technical advantages and disadvantages in using twisted pair cable as a medium for carrying RGB video. This type of cable is typically constructed using eight wires configured as four twisted pairs within a common outer sheath. Each twisted pair can carry a balanced electrical signal in such a way that the effect of noise voltages induced equally onto both wires is removed by receiving circuitry that detects the voltage difference between the two wires. This enables the effect of electrical noise on the transmitted signals to be minimised.

Unfortunately, RGB signals transmitted over twisted pair cable are attenuated more rapidly than with 'tri-coax' cable causing the picture to degrade more quickly. Further, the higher frequency components of the video signal are attenuated by the cable more than the lower frequency components causing smudging at colour transitions on the picture. The attenuation and smudging gets worse as the cable distance increases.

The four twisted pairs contained within a typical data cable are not sufficient to allow a pair to be used for each of the red, green, blue, horizontal synchronisation and vertical synchronisation signals. In practical applications it is frequently desirable to transfer other digital and analogue signals over the same wire as the RGB video. These signals can include those that flow to and from human interface devices (HIDs) such as keyboards, mice, speakers and microphones.

Although twisted pair cable is relatively inexpensive and widely used within buildings, installation of new cables can be inconvenient and costly. Expanding computer networks and telephone systems that compete for connection sockets can often make the installed building cabling a valuable resource. Consequently, products that use the minimum number of twisted pair cables are more desirable due to their lower cost and greater convenience.

According to an aspect of the invention, there is provided a system for transmitting electrical signals between a computer and peripherals along a twisted pair cable. The system can comprise a computer interface, a peripheral interface and a twisted pair cable in communication between the computer interface and the peripheral interface. A red, a green and a blue video colour signal, a horizontal and a vertical video synchronisation signal and at least one audio signal from the computer are transmitted via three twisted pairs of the cable to the peripherals.

According to a further aspect of the invention, there is provided apparatus for transmitting a multiplexed video synchronisation signal and an audio signal from a computer to a video display unit and an audio output. The system can include a signal combiner, which receives a video synchronisation signal from a video output of a computer, a sampler which samples the audio signal and communicates the sampled audio signal to the signal combiner, a twisted pair cable connected at a first end to the signal combiner and a signal separator connected to a second end of the twisted pair cable. The signal combiner can modulate the amplitude of the video synchronisation signal with the sampled audio signal and the signal separator can provide separate transmitted video synchronisation and audio signals to the video display unit and the audio output respectively.

According to a further aspect of the invention, there is provided a system for transmitting electrical signals between a computer and peripherals along a twisted pair cable. The system can comprise a computer interface, a peripheral interface and a twisted pair cable in communication between the computer interface and the peripheral interface. A video colour signal, a video synchronisation signal and an audio signal from the computer can be transmitted via a single twisted pair of the cable to the peripherals.

According to a yet further aspect of the invention, there is provided a method for transmitting electrical signals between a computer interface and a peripheral interface. The method can comprise providing a twisted pair cable connected between the computer interface and the peripheral interface. A red, a green and a blue video colour signal, a horizontal and a vertical video synchronisation signal and at least one audio signal can be transmitted from the computer interface to the peripheral interface via three twisted pairs of the cable.

According to a further aspect of the invention, there is provided a method for transmitting electrical signals between a computer interface and a peripheral interface. The method can comprise providing a twisted pair cable connected between the computer interface and the peripheral interface. A video colour signal, a video synchronisation signal and audio signal can be transmitted from the computer interface to the peripheral interface via a single twisted pair of the cable.

The invention maximises its desirability and applications by allowing the use of just one standard 8-wire twisted pair cable and by supporting long cable lengths. This functionality is achieved by a carefully designed signal multiplexing strategy and the use of signal compensation circuits that boost the signals to compensate for the loss introduced by long cables. By multiplexing peripheral signals together with the RGB video onto a single twisted pair data cable the invention enables a keyboard, monitor, mouse, microphone and set of stereo speakers to be located at some distance away from the computer that they are interacting with.

The ability to locate a keyboard, monitor, mouse, microphone, set of speakers and an RS232 device at some distance from a computer using a single inexpensive twisted pair data cable provides an answer to many practical requirements. In areas of high security or high risk of theft it is undesirable to locate high value computers in accessible areas. The invention enables high value computers to be locked away in a secure area whilst allowing access to the computer from a less secure site such as an open plan office or an area that is open to the general public. A spin-off advantage of such a configuration is that the computer disk drives remain inaccessible thus avoiding the possibility of the introduction of computer viruses or the removal of confidential information by unauthorised personnel. This combination of features makes the invention particularly useful for applications in schools and colleges where theft and computer viruses are sometimes a problem but where are a number of peripheral devices need to be supported for educational reasons.

Due to the increase in computer usage it is now common for companies to have banks of computers that perform dedicated tasks such as file and print servers, internet gateways and firewalls, email and fax servers, web servers and computers serving telephony and voicemail systems. These computers may only need to be monitored on an occasional basis and so they are often grouped together in a computer room and connected to a keyboard/video/mouse (commonly abbreviated to KVM) switch to avoid the need for a dedicated keyboard, monitor and mouse for each computer. Some KVM switches are fitted with two or more control ports to allow the system administrator to access the bank of computers both within the computer room and from another location such as their office. This aspect of the invention provides a convenient means of connecting the remote keyboard, mouse and monitor located in the system administrator's office to the KVM switch in the computer room.

The two preceding application examples, namely (1) the control of a PC from a remote location and (2) the control of a KVM switch from a remote location are potential uses of an aspect of the invention. It will be recognised that there are many other possible applications for the invention. These include, but are not limited to, the distribution of video information services to monitors located throughout a building such as an airport terminal or bank and use in classroom or other training environments. Industrial applications are also anticipated whereby valuable computers are located away from dirty environments or heavy machinery.

The range of human interface devices (HIDs) that are commonly used to interact with a PC have expanded from the early days of computers when they were frequently operated using just a keyboard and monitor. Modem multi-media PCs support many more HIDs including mice, joysticks, microphones and speakers. Although keyboards and mice have traditionally been the primary HIDs, the growth of multi-media PCs, internet telephony and speech recognition systems have elevated the importance of speakers and microphones. To allow the invention to be used for multi-media, internet telephony and speech recognition applications the system is designed to concurrently support a keyboard, mouse, monitor, microphone and set of stereo speakers using a single 8-wire twisted pair cable. It does this by employing a carefully crafted multiplexing strategy that superimposes analogue and digital signals to create hybrid signals, and combines various digital data streams to be transmitted over a shared digital data link. The multiplexing and signal allocation strategy that is used by the invention to squeeze all of the signals onto the four twisted pairs has been designed so that digital to analogue and analogue to digital conversions are minimised. This reduces the data rate requirements on the digital data link leaving sufficient data throughput capability to implement a pseudo Universal Serial Bus link and an RS232 link in addition to the keyboard, mouse and control data transfer functions.

If three pairs of wires are allocated for use by the three video colour signals, the horizontal and vertical sync signals and two audio channels, a single pair of wires can be used for other functions. An aspect of the invention uses this last pair of wires to implement a two-way data link by transmitting data bytes serially, one bit at a time. Unlike the other three pairs of wires, where the computer-end circuit transmits and the user-end receives, this last pair is configured to transfer data in both directions. However the user-end interface circuit and the computer-end interface circuit cannot both be transmitting onto the same pair of wires at the same time or there would be a conflict. Consequently a transmission protocol is employed that ensures that both devices are not transmitting at the same time.

Keyboard and mouse data tends to flow mainly from the user-end to the computer-end. Consequently the user-end can be allocated as the device that controls the digital data flow and initiates transfers of data in both directions. The user-end circuit can send data commands to the computer-end circuit and validate its reception by setting a high impedance state and reading an acknowledge bit from the receiver. Depending on the command, the user-end can then either sends serial data bytes or receives serial data bytes using known timing. The user-end can regularly poll the computer-end for data allowing data to be transferred reliably and promptly in both directions. The exact detail of the protocol implementation is not regarded as an important aspect of this invention because various different protocols could be utilised to achieve the same result. The two way data link is capable of transferring multiple data streams by tagging the data transmitted over the data link with identification information so that the receiving circuitry can separate out the data for each data stream.

A low level audio signal can conveniently be superimposed onto the digital data signal without causing problems because the digital signal is detected on a threshold basis. Consequently an audio and digital signal can be carried together on the same pair of wires and a reasonable quality audio signal can be recovered from the combined signal by the computer-end interface circuit. This audio channel, travelling from the user-end to the computer-end is ideal for the support of microphones.

In order to broaden the applications that are addressed by the invention a number of useful options are suggested. These options illustrate the range of future applications that are anticipated for the invention. For security sensitive applications a passworded access lock is proposed. The lock is activated by a hotkey sequence or switch and once activated the video output from the computer-end interface circuit is disabled along with the flow of keyboard and mouse data to the computer. The video can then only be enabled by entering the password on the keyboard. The password is stored in the computer-end interface circuit and so the security lock cannot be bypassed by using a spare user-end interface circuit. For remote reboot applications a controllable mains switch attached to the computer-end interface circuit is proposed. This switch is controlled remotely from the user end by a push button or keyboard hotkey sequence and enables the computer to be powered down and re-powered from the user-end.

The Universal Serial Bus is a powerful and convenient way of connecting local peripherals to a host computer. The term 'Universal Serial Bus' relates to the hardware and software that allows a computer to be connected to and operate with a peripheral device. The host computer includes a controller which interfaces the computer with the physical bus, along which signals travel, to which peripheral devices can be attached. The transmission of data is controlled by a USB protocol which comprises a set of rules, procedures and conventions relating to the format and timing of data transmission between devices. Multiple peripherals may be connected to a single shared Universal Serial Bus and data transfer between the peripherals and the host computer is achieved by allowing each peripheral to use time on the USB bus in turn. The flow of data across the Universal Serial Bus is controlled by the host computer.

The Universal Serial Bus was designed as a system for connecting local peripherals to a host computer and consequently it is implemented in a way that limits the maximum cable distances to just a few meters. The Universal Serial Bus specification specifies this limit as 5 meters. Consequently a fundamental difficulty arises in transferring USB signals using the USB protocol over the distances targeted by the invention which are much longer than 5 meters.

According to an aspect of the invention, there is provided a pseudo Universal Serial Bus system for transmitting electrical signals between a computer and a peripheral along a cable, comprising:

a computer interface, including a USB peripheral emulator;

a peripheral interface including a USB host emulator; and a cable in communication between the computer interface and the peripheral interface which transmits signals under a USB independent protocol via the cable.

This aspect of the invention overcomes this fundamental difficulty by recognising that the core device data can be extracted from the USB protocol signals and transferred over extended distances via a cable and using a suitable extended-distance protocol and then reconstituted back into USB protocol signals to be sent to the receiving device. The extended-distance protocol enables a range of useful devices to be supported including keyboards and mice. Further devices can easily be supported by using a higher speed protocol or more interconnection wires to increase the available data transfer bandwidth of the extended distance protocol. There is a wide range of applications for this aspect of the invention.

The USB is essentially a local means of interfacing a computer and a peripheral device. This aspect of the invention allows a computer and peripheral device to be more distant than the USB specification would allow while still being able to take advantage of the USB system. A cable is used to connect the computer and peripheral over a long distance. The cable can be a twisted pair cable but is not limited to a twisted pair cable. The cable need only be capable of transmitting signals under a USB independent protocol.

This allows USB keyboards, USB mice and other devices to be supported. An embodiment of this aspect of the invention physically achieves the multiplexing of signals by utilising a pair of interface circuits each connected to one end of a cable. The pseudo Universal Serial Bus implemented by this aspect of the invention is configured to support a keyboard and mouse but the inherent flexibility of the USB and the associated connector standardisation means that a large number of other devices such as printers, joysticks, disk drives, scanners and cameras could be supported using the same technique.

The invention can provide a system that allows the maximum number of computer peripheral devices to be supported over a single 8-wire extension cable. The overall result being to provide the ability to locate a good proportion of the computer's user interface at some distance from the computer base unit. The invention recognises the requirement to support more than just a keyboard, monitor and mouse over an extension link and provides a solution to the problem of how to multiplex an RGB video signal, three audio signals and a two-way high speed data link all over the same 8-wire cable. By providing a strategy for multiplexing all these signals the invention can simultaneously support a keyboard, monitor, mouse, microphone, a set of stereo speakers, an RS232 link and a high speed two-way data transfer capability. This high speed data transfer capability is used to implement a pseudo Universal Serial Bus (USB) connection to support a range of other peripherals. Although this high speed data transfer link could have been terminated with specific connectors for each type of device, the invention's use of a USB termination is seen as being particularly beneficial because it enables a wider choice of devices to be supported in a more flexible manner. The increasing availability of USB devices is making this feature even more useful.

The applications addressed by this aspect of the invention can be considerably expanded by providing a pseudo Universal Serial Bus (USB) link between USB peripherals connected at a user-end and a USB host connected at a computer-end. This pseudo USB link is therefore regarded as being particularly important. The pseudo USB link on the current invention supports keyboards and mice but it can be seen that this link can easily be adapted or reconfigured to support other USB peripherals.

The range of peripherals supported by the Universal Serial Bus is constantly expanding but currently includes keyboards, mice, joysticks, disk drives, cameras, printers, scanners, microphones and speakers. The Universal Serial Bus provides a mechanism by which the invention is able to support a diverse range of peripherals without providing dedicated signals or large numbers of different types of connectors. It therefore fits in well with the design philosophy of the invention which is to support the largest number of computer peripheral devices at a distance from the computer base unit via a single 8-wire twisted pair cable.

In order to get the USB host computer to communicate with the USB keyboard and USB mouse it is necessary to give the host computer the illusion that it is connected to the peripherals via a USB and the peripherals the illusion that they are connected to the host computer via a USB. This aspect of the invention achieves this by implementing a peripheral emulator circuit and a host emulator circuit. The overall effect of the peripheral emulator circuit combined with the host emulator circuit and the extended data link is to provide a pseudo extended Universal Serial Bus linking the computer to the USB keyboard and USB mouse The peripheral emulator circuit is connected to the host computer via a Universal Serial Bus connection and communicates with the host computer using the USB protocol. The peripheral emulator circuit emulates the presence of a USB keyboard and USB mouse on the USB in a manner that makes the computer think that it is connected to these peripherals via the USB. The peripheral emulator then extracts the data destined for each peripheral into a form that is independent of the USB protocol and transmits it over the extended distance link using the extended distance protocol to the host emulator circuit. Data transferred using the extended distance link is identified so that it can be sent to the correct peripheral when it is processed by the host emulator circuit. Data received from the USB keyboard and USB mouse via the host emulator circuit and the extended distance link is converted back into USB protocol format by the peripheral emulator circuit and sent to the host. Again, data transferred from the host emulator circuit via the extended distance protocol is source identified so that the peripheral emulator can process it accordingly.

The host emulator circuit is connected to the USB keyboard and USB mouse via Universal Serial Bus connections and communicates with the peripherals using the USB protocol. The host emulator circuit emulates the presence of a USB host on each of the USBs in a manner that makes the peripherals think that they are connected to a host via a USB. The host emulator then extracts the data destined for the host into a form that is independent of the USB protocol and transmits it over the extended distance link using the extended distance protocol to the peripheral emulator circuit. Data received from the host via the peripheral emulator circuit and the extended distance link is converted back into the USB protocol format and sent to the peripherals.

The peripheral emulator circuit is able to continuously emulate the presence of a USB keyboard and USB mouse but for ease of use reasons it may be undesirable for the computer to think that a connection to each of these peripherals is available when they are not actually connected to the host emulator circuit. Consequently the host emulator circuit communicates the presence of each of these devices to the peripheral emulator circuit when it detects that they have been connected to its Universal Serial Buses. This information then triggers the peripheral emulator circuit to signal the presence of the peripheral to the host computer via the USB. The host emulator circuit also communicates information that it has collected from the peripheral back to the peripheral emulator circuit. This information is then used by the peripheral emulator circuit to configure itself to look like the specific model of peripheral that has been connected to the host emulator circuit's Universal Serial Bus. In this way the pseudo extended USB is able to act in a way that mimics the operation of a real Universal Serial Bus.

The firmware and hardware implemented within the peripheral emulator circuit and the computer emulator circuit of the current invention supports USB keyboards and USB mice. However it can be seen that the firmware and hardware can be expanded using a similar treatment to that employed for USB keyboards and USB mice to support a range of other USB devices. Therefore extended links supporting a variety of USB devices are considered to fall within the ambit of this invention. The number of devices can also be expanded by increasing the hardware and firmware of the peripheral emulator circuit and the computer emulator circuit particularly in relationship to the number of USB device addresses and endpoints supported. Therefore extended USB links of the type employed by the invention that support more USB devices are considered to fall within the ambit of this invention.

The invention's support for USB keyboards and mice enables the invention to address applications that would be inconvenient to address by other means. Some Apple Macintosh computers are now supplied exclusively with USB keyboard and USB mouse connections. The invention is able to support these computers by allowing a USB keyboard and USB mouse to be connected. This is seen as a neater solution than using a PS/2 to USB converter because the keyboard and mouse supplied with the computer can be used rather than a non-native keyboard and mouse that are designed for use on another type of computer and which may have different key legends. The rise in popularity of USB keyboards and mice may make them a preferred type and so providing the ability to use them with the invention is an advantage.

An added advantage of the invention's pseudo USB link is that it enables two of the sets of peripherals to be used to access the same computer. The first set connected to the more conventional PS/2 ports and the second set being connected to the Universal Serial Bus. Operating systems such as Microsoft's Windows 98 running on IBM compatible PCs enables both sets of keyboards and mice connected in this way to be used at the same time. The addition of a one-to-two video broadcast unit located by the computer provides an overall system that gives dual keyboard/monitor/mouse access of the same computer from two different remote locations.

Analogue audio signals present particular challenges as, although they have a bandwidth that is typically less than 20 kHz, they are nevertheless expensive to transfer in digital format as expensive Digital to Analogue (D to A) and Analogue to Digital (D to A) converters are needed along with a high digital data rate requirement on a digital data link. There are therefore significant advantages to transferring audio signals in an analogue format. Such audio signals could be transmitted as common mode signals whereby the audio signal causes both wires to vary by the same amount in respect to ground but by nothing with respect to each other. The difficulty with such a transmission system is that the audio quality is affected by ground noise and the system may emit significant radio frequency energy causing potential problems meeting electromagnetic emission regulations. Consequently an alternative analogue transmission method is required.

According to an aspect of the invention, there is provided apparatus for transmitting a multiplexed video synchronisation signal and audio signal from a computer to a video display unit and an audio output, comprising:

a signal combiner which receives a video synchronisation signal from a video output of a computer;

a sampler which samples the audio signal and communicates the sampled audio signal to the signal combiner;

a twisted pair cable connected at a first end to the signal combiner;

and a signal separator connected to a second end of the twisted pair cable, in which the signal combiner modulates the amplitude of the video synchronisation signal with the sampled audio signal and the signal separator provides separate transmitted video synchronisation and audio signals to the video display unit and the audio output respectively.

This aspect of the invention utilises the shape and characteristics of the synchronisation signal to carry a sampled audio signal. Preferably the synchronisation signal is the horizontal synchronization signal. The repeat frequency of the regularly occurring horizontal synchronisation pulse is sufficiently high to enable the sampled audio signal to be superimposed whilst the horizontal pulses are active and reconstituted by the receiving circuitry into a reasonable quality audio signal.

The multiplexing method is particularly advantageous because the sharp signal level changes of the digital horizontal sync pulses allow easy identification of the area of sampled audio and therefore simplify the circuitry required in the receiver to reconstitute the audio signal. Another feature of the design is that the quality of the audio increases with the increasing horizontal synchronisation frequency used for higher resolution video pictures. It should also be noted that the audio is effectively transmitted as a balanced differential mode signal which does not suffer from the same noise problems as the common mode signals discussed earlier. Two pairs of wires can each be used to carry an audio signal from the computer-end to the user-end. This is achieved by multiplexing the horizontal sync signal onto both pairs of wires with one being the active signal and the other being a dummy signal whose purpose is to provide a mechanism for carrying the audio signal. By using this arrangement, two audio channels for stereo speakers can conveniently be carried from the computer-end to the user-end.

The red, green and blue video colour signals generated by many personal computers are high bandwidth signals that typically have significant frequency components between 0 and 100 MHz. Due to their high frequency each one is transmitted on a separate twisted pair. This effectively allocates three of the four pairs available on a typical 8-wire cable and so some multiplexing is provided. To avoid the need to reverse the signal transmission direction it is advantageous to multiplex signals with the colour signals that travel in the same direction (i.e. from the computer-end to the user-end). The horizontal and vertical video synchronisation signals are good candidates as these signals are only active when the video signals are inactive and vice versa. By performing some electronic manipulation, the active polarity of the video signals can be made to be the opposite of the active polarity of the synchronisation signals. A combined colour and synchronisation signal can then be transmitted down a pair of cables and separated out again using circuitry at the receiving end of the cable.

Twisted pair cables attenuate high frequency video signals relatively rapidly with increasing length. To compensate for this attenuation it is necessary to boost the signal. If the signal is boosted too much then over-compensation occurs and the video picture quality degrades. If the signal is boosted too little then under compensation occurs and the picture quality degrades. The best video picture is obtained when the level of signal boost matches the level of signal loss caused by the cable.

According to an aspect of the invention, there is provided apparatus for compensating a video signal transmitted along a cable from a computer to a video display unit, comprising:
  a cable transmitting a video signal from a computer;
  an amplifier receiving the transmitted video signal; and
  a compensation signal generator, in which the compensation signal generator supplies a single compensation control signal to the amplifier to alter the gain of the amplifier so as to provide a video signal compensated for transmission degradation.

The level of signal loss caused by the cable is dependent upon the length of the cable and so the ideal amount of boost also varies with cable length. Aspects of the invention are designed to be used with (but not limited to be used with) any length of twisted pair cable, up to approximately 300 meters. Consequently the amount of signal boost required to create the best video quality will vary with the length of cable used in the application. This aspect of the invention allows the level of compensation to be varied to try and produce the closest practical match to the ideal level of signal boost.

A preferred feature of an aspect of the invention enables the user to manually select the level of compensation, for example by pressing a special hotkey sequence on the keyboard connected to the user-end interface circuit. This hotkey sequence activates a configure mode that enables the user to press the up and down keyboard cursor keys to dynamically alter the level of compensation applied by the compensation circuit. The video picture provides feedback to the user and when the best video picture quality equating to the best level of compensation has been found the setting is saved in memory and retained for future use by pressing the keyboard enter key.

Although the level of compensation can be fully controlled by the manual selection technique there are some advantages to be gained by enabling the circuitry to automatically select an appropriate level of compensation without input from the user. Hence a preferred feature of an aspect of the invention is automatic compensation. Automatic compensation aids the user-friendliness of the invention by ensuring a reasonable video picture quality when the system is first connected or when a new interconnection cable is used. For maximum convenience and controllability the current invention can use a combination of both manual and automatic compensation techniques. The automatic compensation circuitry can select an appropriate level of compensation leaving the user to fine tune the compensation for the best picture quality using the manual technique.

Sophisticated circuitry could be used to automatically and accurately calculate the ideal level of compensation by transmitting a known frequency reference signal of a given amplitude from the computer-end and varying the level of compensation at the user-end until the desired amplitude level is restored. The implementation of such circuitry would be relatively costly and would probably not be justified by the advantages gained because automatic compensation is a user-friendliness issue and not essential for the operation of the invention.

A preferred feature of an aspect of the invention provides a cheaper automatic compensation technique that is less accurate but nevertheless achieves the level of user-friendliness required. This technique measures the resistance between a pair of wires at one end of the cable that are terminated at the other end of the cable by a known resistance. The resistance measurement is achieved by applying a known voltage and measuring the current that flows. The resistance per unit length of typical twisted pair cables is consistent enough to make a reasonable prediction of the length of the cable from the resistance measurement. The level of compensation required for a given length of typical twisted pair cable can be reasonably predicted and so a reasonable compensation setting can be predicted from the resistance measurement.

A microprocessor can be used to combine the information supplied by the resistance measurement circuit and the manual setting selected by the user to create a variable voltage signal that controls the level of compensation applied. If a manual setting is currently stored then this overrides the automatic setting. The manual setting can be cleared when the interconnection cable is disconnected and the computer-end circuit loses communication with the user-end circuit. This process effectively reactivates the automatic compensation when the setup is changed and a new length of interconnection cable is used.

According to an aspect of the invention, there is provided apparatus for compensating a video signal transmitted along a cable comprising a fixed gain amplifier and a variable gain amplifier, in which the transmitted video signal is passed through the fixed and the variable gain amplifiers, and the output of the variable gain amplifier and a portion of the output of the fixed gain amplifier are combined to provide a video signal compensated for transmission degradation.

The attenuation caused by passing a signal down a length of twisted pair cable can be considered as the result of a combination of a DC (zero frequency) attenuation characteristic and an AC (non-zero frequency) attenuation characteristic. DC attenuation is caused by the resistance of the cable and can typically be seen on a video picture as a general loss of brightness. AC attenuation generally increases with signal frequency and can generally be seen on a video picture as a smudging effect, particularly in areas of sharp dark to light colour transitions. A length of cable imposes a combination of both DC and AC attenuation to a signal that is passed through it. This combination of attenuation can be seen as a combined smudging and general loss of brightness on a video picture.

A single amplifier with a characteristic that compensates well for both DC and AC attenuation of video signals is hard to build practically so an aspect of the invention uses a combination of two amplifiers to compensate the colour components of the video signal. Each colour component signal can be combined with other signals which also benefit from the signal quality improvement provided by the compensation circuit.

Some current systems that provide compensation for video signals implement separate controls to compensate for the AC smudging and the DC brightness picture degradation. Such dual controls are more complicated than is necessary because changes in the DC and AC attenuations are associated and occur together as the cable length is varied. Consequently this aspect of the invention implements a single control signal that controls a circuit that applies a mixture of DC and AC gain together so that the picture brightness is restored at the point where the smudging is removed. This has the significant advantage that the user only needs to select one compensation setting to maximise the video quality. There are further circuitry implementation advantages because just one control voltage needs to be generated. This reduces the cost of the circuitry and makes the implementation and integration of the automatic compensation system easier.

In addition to the user-friendliness and system implementation advantages of this compensation technique, it is also easy to neatly construct the circuitry using cost effective components because only one of the two amplifiers needs to have a controllable variable gain. The other amplifier can be of the cheaper fixed gain variety. The reason for this is that one of the two amplifiers generally restores the signal assuming no loss and the other amplifier generally compensates for the signal loss. This means that the final signal can always contain 100 percent of the signal from the first amplifier which can therefore be of the fixed gain type.

The final compensated signal is constructed by adding the signal from the first fixed gain amplifier to the signal from the second variable gain amplifier which also has a designed frequency dependent gain characteristic. The second variable amplifier and addition functions can be neatly implemented using a Comlinear CLC522 voltage controllable variable gain amplifier. The gain of the Comlinear CLC522 is conveniently controlled by a single control voltage. This voltage can be fed to the CLC522s in each of the red, green and blue compensation circuits so that the same compensation is applied to all the colour components of the video picture.

The construction and length of a twisted pair cable affects the quality of the video signal that can be practically transmitted across it. The most commonly available cable often is constructed in such a way that each twisted pair has a different number of twists per meter to all the other pairs. The reason for this is that twisted pair cable is commonly used for transmitting digital signals and the twist mismatch between the various pairs minimises the signal crosstalk between pairs. This cable characteristic is not ideal for transferring red green and blue video signals because the varying twist rate creates a length difference between the twisted pair wires for a given length of the overall multi-pair cable. This difference in wire length introduces a difference in the propagation delay between the colour components of the video picture with the result that the colours on the video screen start to separate and create a misalignment effect. In practical applications with typical twisted pair cable, this colour separation effect is minimal for cables that are shorter than 75 meters and lower video screen resolutions. As the video screen resolution and cable length are increased the colour separation becomes more noticeable.

According to an aspect of the invention, there is provided apparatus for transmitting three colour components of a video signal between a computer and a video display unit, comprising a cable including three twisted pairs, one pair for carrying a respective one of a first, second and third video colour signal, in which locally the twist frequency of each pair differ, but the number of twists along the entire length of each pair is sufficiently similar that each of the first, second and third video colour signals travel along substantially the same actual length of wire.

This aspect of the invention ensures that each of the colour signals passes along the same length of actual wire and so reduces the separation of the colours while retaining the different local twisting rates of the wires to minimise cross talk between the wires. The twist frequency of a wire can be considered to be the number of twists per unit length of the wire.

Preferably, the cable comprises three equi-length sections of cable and connectors joining a first and a second of the sections of cable and the second and a third of the sections of cable.

To compensate for colour separation effects, this aspect of the invention can provide a hybrid cable that can be made by modifying a length of inexpensive twisted pair cable that has different numbers of twists per meter for each of the twisted pairs. The general construction of this hybrid cable is such that each of the three colour components of the video signal travel though a roughly equal length of each of the twisted pairs. This is achieved by splitting the cable into three segments of roughly equal length and connecting them together by crossover nodes at the interface between each section. This cable ensures that the signal path for each of the colour components runs through roughly the same overall length of wire. This minimises the colour separation effect and allows higher resolution video to be used at longer distances without significant degradation by colour separation.

For may applications the hybrid cable can be terminated by RJ45 plug connectors. Twisted pair cables terminated by RJ45 plug connectors are often wired on a straight through (pin 1 to pin 1, pin 2 to pin 2, etc.) basis. The hybrid cable inherently swaps the signal positions because a signal that started out on one pair ends up on a different pair at the other end of the cable. This can be corrected by wiring the RJ45 plugs so that the same signals appear on the same connector pins at both ends of the cable. The terminated hybrid cable can then have straight through wiring.

To avoid the need to have a special cable manufactured, the hybrid cable can be constructed using three roughly equal lengths of 4-pair cable that are terminated at each end by RJ45 plug connectors and connected together by two junction boxes that swap the pairs at each junction. These junction boxes enable a user to plug together a hybrid cable system without having to purchase a specific length of custom made cable. If a third junction box is connected to the end of the cable together with a further short length of 4-pair cable terminated at each end by an RJ45 plug connector then the colour signals at both ends of the finished hybrid cable assembly appear on the same pins of the RJ45 connector given that each of the connecting cables are wired on a straight though basis (pin 1 to pin 1, pin 2 to pin 2 etc.). Conveniently, the same specification of junction box can be used in each of the three positions.

An above aspect of the invention relates to a particular way of transmitting audio signals from the computer end to the peripheral end. A further aspect of the invention relates to a general way of transmitting signals between the computer and peripheral ends. Signals transmitted in a conventional manner are subject to a degree of noise introduced by the system. This noise can be removed but with some difficulty. A further aspect of the invention provides a more efficient technique of transmitting the signals between the computer end and peripheral end with an acceptable noise level.

A pair of wires may be considered as carrying two types of signals: a differential mode signal and a common mode signal. These two types of signals may be regarded as independent signalling means because one may be varied without affecting the other. The differential mode signal is represented by the voltage difference between the two wires and the common mode signal is represented by the voltage difference between a reference voltage, that may be the circuit ground, and the average of the voltages on the two wires. It is common practice to transmit signals in differential mode as the effect of noise voltages induced equally on both wires may be removed by the receiving circuitry. This is not the case for common mode signals which are therefore not generally suitable for transmitting signals that are sensitive to noise such as analogue audio signals.

According to an aspect of the invention, an audio signal is transmitted between the peripheral interface and the computer interface as two common mode signals each transmitted via a separate one of the twisted pairs. The system can transfer the audio signal from the user-end interface circuit to the computer-end interface circuit by transferring the audio signal as two common mode signals on separate twisted pairs. Preferably, the interface provides a difference between the two common mode signals to reconstitute the transmitted audio signal without noise generated during the transmission of the audio signal between the peripheral and computer interfaces.

The system uses a single twisted pair cable consisting of four twisted pairs of wires to transfer a multitude of signals between the computer-end interface circuit and the user-end interface circuit. The differential mode signals on all four pairs of conductors are heavily utilised to transfer red, green and blue video signals; horizontal and vertical synchronisation signals; stereo audio signals and two-way digital data signals. Consequently the advantage of using common mode signals to carry audio in such a system can easily be understood as common mode signalling may be performed independently of differential mode signalling.

The main problem with using common mode signals to carry audio is that the noise voltages induced on the cable can be heard on the audio signal. This aspect of the system is designed to carry signals over many meters and at these cable lengths the induced noise produces a poor audio signal that is generally unacceptable, in the absence of a noise suppression technique.

One of the interfaces can include an audio signal inverting means, which inverts the audio signal prior to transmission via a first of the twisted pairs, and the other interface can include a subtractor means supplied with a non-inverted audio signal transmitted via a second of the twisted pairs and the inverted audio signal transmitted via the first of the twisted pairs to generate a difference signal in which electrical noise generated in the audio signals during transmission has been reduced. Preferably, the transmitting interface also includes a reference voltage source which generates a reference signal and adding means for combining the reference signal to the audio signal prior to transmission via the twisted wires.

The transmission noise problem can preferably be overcome by utilising two common mode signals that are transmitted over two pairs of adjacent wires. The audio signal can be transmitted by the user-end interface circuit as a common mode voltage on a first pair of twisted wires. The audio signal is also inverted and transmitted as a second common mode voltage on a second pair of wires. At the computer-end interface circuit the two common mode voltages are extracted and the circuit takes the difference between the two signals. The noise voltages induced onto each of the two pairs of wires are similar because they are contained within the same cable and run between the same two locations. The common mode voltages on each of the two pairs of wires are organised to be equal to (Vref+A) and (Vref−A) respectively, where A is the audio signal and Vref is a chosen reference voltage. Considering the case where the induced noise (N) is applied equally to both the common mode signals (an approximation to what is found in practice), the resulting common mode signals at the receiver will be (Vref+A+N) and (Vref−A+N) respectively. Taking the difference between these two signals ((Vref+A+N)−(Vref−A+N)) it can be seen that the resulting signal (2A) is independent of the noise voltage (N). In practice this technique reduces the noise sufficiently to enable a reasonable quality audio signal to be transmitted between the two interface circuits.

Aspects of the present invention will now be described, by way of example only, with reference to the accompanying drawings, in which:

FIG. 4(*b*) illustrates the time variation of a video synchronisation signal;

FIG. 4(*c*) illustrates the time variation of an audio signal;

FIG. 4(*d*) illustrates the time variation of a multiplexed video colour, video synchronisation and audio signal by apparatus according to an aspect of the invention;

FIG. 4(*e*) illustrates the time variation of a reconstituted audio signal by apparatus according to an aspect of the invention;

The same parts in different Figures share common reference numerals.

Figure 1:
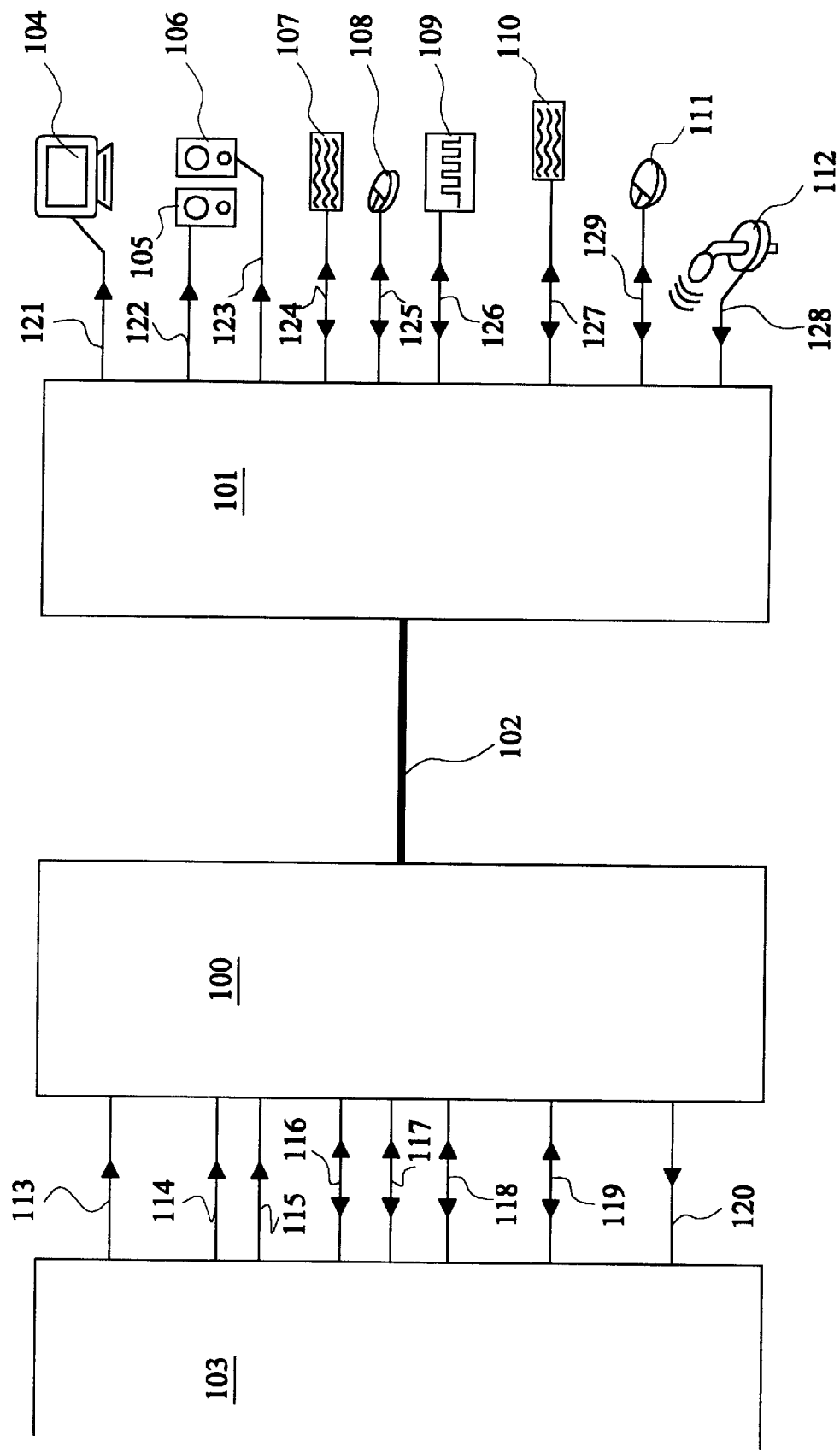
FIG. 1 shows a schematic illustration of a computer signal transmission system.
Figure 2:
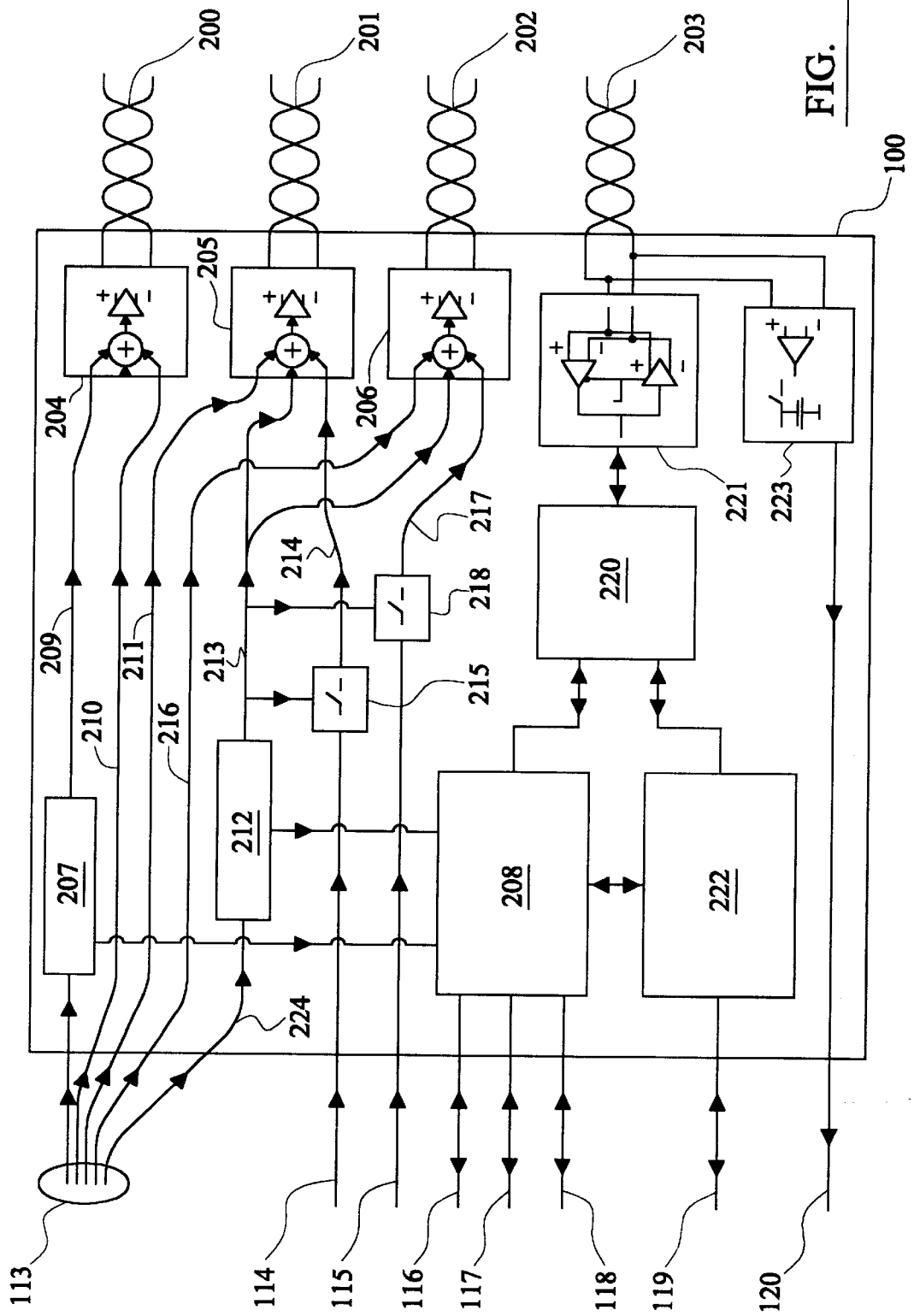
FIG. 2 shows a functional block diagram of a computer interface part of the system including apparatus according to aspects of the invention.
Figure 3:
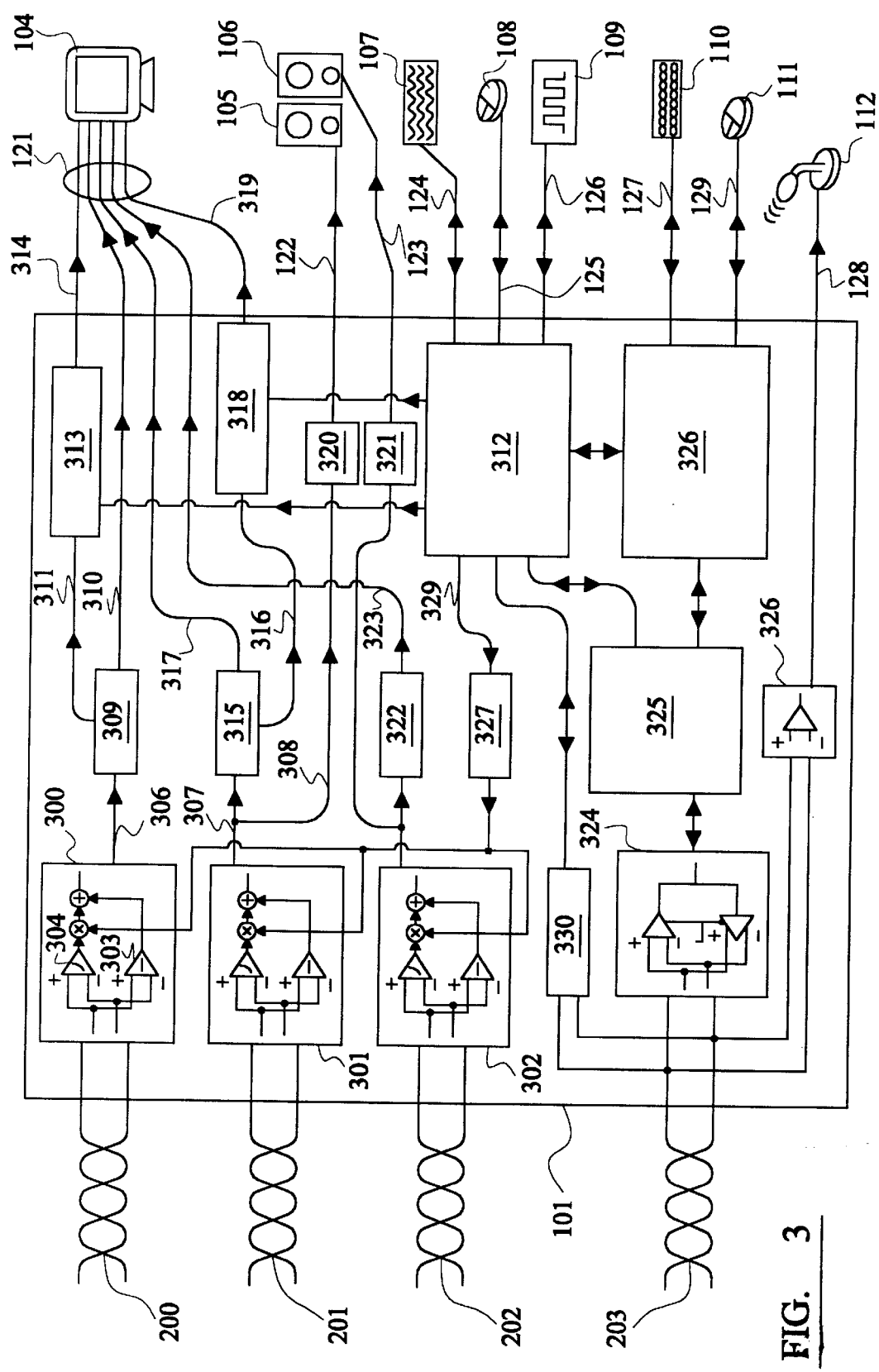
FIG. 3 show a functional block diagram of a peripheral interface part of the system including apparatus according to aspects of the invention.

Various aspects of the present invention will now be described with reference to FIGS. 1 to 6. FIG. 1 shows a schematic overview of the computer signal transmission system being used to connect a group of peripherals (104 to 112) to a computer (103) using a twisted pair cable (102). FIG. 2 is a diagrammatic representation of the major features of the computer-end interface circuit (100) and its connections. FIG. 3 is also a diagrammatic representation and this shows the major features of the user-end interface circuit (101) and its connections.

Referring to FIG. 1, the computer-end interface circuit (100) connects to the user-end interface circuit (101) via an 8-wire twisted pair cable containing 4 twisted pairs (102). In typical applications this cable (102) is up to 300 meters long although the invention is not limited to cables of this distance. The computer-end interface circuit (100) is connected to an electronic device (103) that is typically a computer but could also be any other device that implements the same type of connections. The computer (103) transmits an RGB (red/green/blue) video signal (113), and two audio signals (114,115) to the computer-end interface circuit (100). The computer-end interface also transmits an audio signal (120) back to the computer (103). In addition the computer (103) and computer-end interface circuit (100) exchange digital data using several digital data connections that include a PS/2 keyboard connection (116), a PS/2 mouse connection (117), an RS232 data link (118) and a Universal Serial Bus (119).

The user-end interface circuit (101) is connected to a group of peripheral devices (104 to 112). It transmits an RGB video signal (121) to the monitor (104) and an audio signal (122,123) to each of the speakers (105,106). It also receives an audio signal (128) from the microphone (112). In addition the user-interface circuit exchanges digital data with a group peripherals (107 to 111) using several digital data connections that include a PS/2 connection (124) to the keyboard (107), a PS/2 connection (125) to the mouse (108), an RS232 data link (126) to an RS232 device (109) and two Universal Serial Bus (127,129) that connect to a keyboard (110) and mouse (111).

The signals (121 to 129) between the user-interface circuit (101) and the peripherals (104 to 112) are associated with, though not always the same as, the signals (113 to 120) between the computer-end interface circuit (100) and the computer (103). Particularly, the computer-end interface and the user-end interface have local processing means that generate data and responses to received data without the need to transfer data via the twisted pair cable (102). This enables certain timing and protocol requirements to be met on PS/2 and USB connections. Additionally the data received from the keyboard (107) is monitored by a microprocessor to detect special hotkey sequences that activate a configuration mode. Once the configuration mode is set, the keyboard cursor keys are used to change the level of compensation applied to the video signals and consequently the associated keyboard data is not sent to the computer (103).

FIG. 2 shows the computer-end interface circuit (100) together with its connections to the computer (113 to 120) and its connections to each of the four twisted pairs (200 to 203) contained within the twisted pair cable (102). The incoming video signal (113) from the computer contains red, green and blue colour signals in addition to horizontal and vertical synchronisation signals that define the start of a picture frame and the start of a scan line respectively.

The computer-end interface circuit (100) combines the green colour signal with the vertical synchronisation (vsync) signal so that they can be transmitted over twisted pair 201. This signal addition is achieved using a signal summer circuit that also contains a differential line driver (204). In order to sum the green and vsync signals in a way that enables them to be easily separated out at the user-end, it is necessary to ensure that the vsync signal is in the opposite polarity to the green signal. Unfortunately the vsync signal can be of either positive of negative polarity depending upon the particular video signal. Consequently a polarity conversion circuit (207) is required. The polarity conversion circuit (207) uses a resistor and capacitor combination to track the average level of the vsync signal. By using the average signal level information, represented by a voltage stored on a capacitor, together with some logic gates the signal is converted into a polarity format that is always negative.

The polarity conversion circuit (207) is wired in such a way that a signal from one of the logic gates indicates the polarity that has been detected. This information is read by a microprocessor (208) which signals the detected level to a microprocessor in the user-end interface circuit so that the user-end is able to restore the original vsync polarity before sending the video signal to the monitor. The negative polarity vsync signal (209) is added to the green colour signal (210) by the summer circuit (204) that also contains a differential line driver. The major component within the summer/driver circuit (204) is a Maxim MAX4142 which sums the signals in such a way that the green colour appears as a positive voltage difference and the vsync pulses appear as negative voltage differences. This is possible because the vsync pulses only occur when the colour signal is zero. The differential line driver transmits the signal as a voltage difference between the pair of wires (201) which increases the signal's immunity to electrical noise.

The red colour signal (211) is combined with the horizontal synchronisation signal (hsync) using similar circuitry to that used to combine the green and vsync signals. Again, the hsync pulse, which may be of positive or negative polarity, is converted into a negative polarity signal (213) by a polarity conversion circuit (212) that is constructed in a similar way to the vertical sync polarity conversion circuit (207). Like the vsync conversion circuit (207), the hsync conversion circuit (212) communicates the detected polarity to the microprocessor (208) so that this information can be transferred to the user-end to enable the polarity to be restored before the video signal is sent to the monitor. The negative polarity hsync signal (213) is then summed together with the red signal (211) by the summer circuit (205) which also contains a differential line driver and which is constructed in a similar way to the green/vsync summer circuit (204). This summer/driver circuit (205) also adds a sampled audio signal (214) so that the voltage difference between the pair of wires 201 represents a combination of the red, hsync and audio signals (225). The audio signal is only added to the combined waveform when the hsync pulse is active. This does not therefore interfere with the video signal as this is always zero during the hsync pulses.

Figures 4A, 4B, 4C, 4D, 4E:
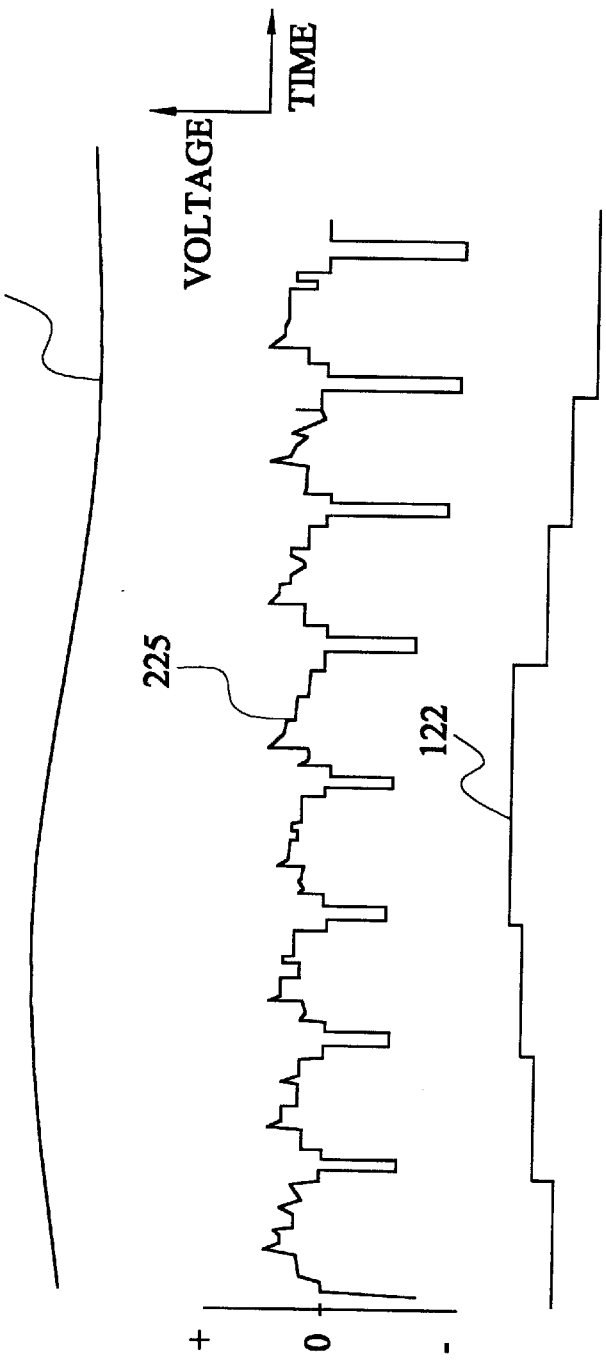
FIG. 4(*a*) illustrates the time variation of a video colour signal.

The hsync pulses are digital signals and so the exact level of the signal during the hsync pulse is not important provided that the signal is above a certain threshold. The resulting waveform is illustrated in FIG. 4, which is not drawn to scale but which illustrates the way that the three signals combine together.

Due to the way that the combined signal is constructed the user-end interface circuit can separate out the three individual signals by detecting a positive signal level to reconstitute the red, a negative signal below a certain threshold to reconstitute the hsync pulses and by using a sample and hold circuit to reconstitute the audio signal. The hsync signal (224) is of a sufficiently higher frequency than the audio signal (114) to enable the hsync signal to be used to sample the audio signal in a way that allows a reasonable audio signal to be recovered at the user-end circuit. The sampled audio signal (214) is created from the original audio signal (114) by using a switching circuit (215) that is controlled by the negative polarity hsync signal (213) in such a way that the audio signal is only passed through the switching circuit during the hsync pulse. The hsync signal is used to gate the sampling of the audio signal.

The blue signal (216) is combined together with the negative polarity hsync signal (213) and the sampled audio signal (217) by the summer/driver circuit (206) that is constructed in a similar way the red/hysnc/audio summer circuit (205). The resulting waveform (219) appearing on twisted pair 202 represents a combination of the blue, hsync and audio signals. This has a similar appearance to the waveform 225 shown in FIG. 4. The sampled audio signal (217) is created using a switcher circuit (218) that operates in a similar way to switcher circuit 215.

The microprocessor assembly (208) mainly consists of an Arizona Microchip PIC16F877 micro together with some associated interfacing circuitry. This microcontroller contains integral flash program memory. It is programmed to implement PS/2 keyboard and mouse connections (116,117) and an RS232 connection (118). All these connections are bidirectional and are therefore able to transfer data in both directions. This two-way data flow is achieved on the PS/2 ports by a protocol that uses a clock and data signal, and on the RS232 ports by supporting separate transmit and receive signals. The microprocessor processes this data and is able to manipulate received data to generate new data, and send and receive data to and from the user-end interface circuit (101) via twisted pair 203. To conform with certain timing requirements the microprocessor is able to generate data in response to certain data commands sent from the computer via the PS/2 connections (116,117) without transferring any data over twisted pair 203. Data received from twisted pair (203) via the cable interface circuit (221) and the data taxi circuit (220) is source identified so that the microprocessor (208) can process it and send it on to an appropriate connection. The microprocessor is also able to exchange data with the USB peripheral emulator circuit (222) thereby performing a conversion to and from USB format.

The microprocessor (208) is able to perform digital data signalling functions although the large amount of processing time that would be required to implement a high speed serial data link protocol over a single pair of wires favours the use of a data taxi circuit (220). The function of this data taxi circuit is to transfer data at high speed to and from the microprocessor (208) and the USB peripheral emulator (222) and then deal with the detailed implementation of the serial data transfer protocol used to transfer data in both directions via twisted pair 203. This data taxi contains data buffering functions and is implemented with an Altera Flex 8000 series programmable logic device that is configured using a configuration EPROM. The serial data transmission protocol used to transfer data between the computer-end and the user-end is USB protocol independent and detailed later. This protocol ensures that the user-end interface circuit and the user-end interface circuit are not both transmitting at the same time. The data taxi circuit tags the data received from the USB peripheral emulator and the microprocessor so that it can be separated out by the user-end circuit. The interface between the data taxi and the twisted pair wires 203 is achieved using a differential driver/receiver circuit (221) that contains a Maxim MAX481.

The USB peripheral emulator circuit (222) is constructed using a Cypress CY7C66113 USB peripheral controller together with some associated components. The CY7C66113 is a One Time Programmable (OTP) microcontoller with integrated USB peripheral control capabilities that supports two USB device addresses. The two USB device addresses allow the CY7C66113 to emulate a keyboard and mouse at the same time. The firmware is written so as to implement a pseudo USB connection for keyboards and mice when coupled with the circuitry within the user-end circuit. The firmware can be changed to support different devices and more devices could be supported by using more CY7C66113s.

Finally on FIG. 2, an analogue audio signal from the microphone (112) is superimposed by the user-end circuit (101) onto the digital data signal on wires 203 and extracted by circuit 223 whilst the signal is positive. The serial data transfer protocol is organised in such a way that this signal is guaranteed to be positive at regular enough intervals to allow the sampled audio signal to be reconstituted into a reasonable quality audio signal by the computer-end circuit (100). The sampled audio signal is reconstituted by the audio restore circuit (223). This uses a combination of amplifiers and capacitors such that a capacitor voltage reflects the level of the voltage between wires 203 whilst it is above a certain threshold and stores this level whilst the voltage is below the threshold. This processes creates an approximate facsimile version (120) of the original audio signal (128).

Referring now to FIG. 3, the user-end interface circuit (101) can be seen together with its connections to the peripherals (121 to 129) and its connections to each of the four twisted pairs (200 to 203) contained within the twisted pair cable (102). Twisted pairs 200, 201 and 202 carry incoming signals from that computer-end interface circuit that contain the green, red and blue colour components of the video picture. These signals have been attenuated by the cable and need to be boosted to compensate for the signal loss in order to ensure a sharp and bright video picture. This compensation is done by the compensation circuits 300 to 302 which are all the same. Each of these compensation circuits contains a Maxim MAX4145 fixed gain amplifier (303) and a Comlinear CLC522 variable gain amplifier (304). A common control voltage (305) is fed into each of the compensation circuits (300 to 302) which controls the gain of the Comlinear amplifier (304) and hence the level of signal boost applied.

The fixed gain amplifier (303) is configured to give a mostly flat gain verses frequency characteristic and the variable gain amplifier (304) is configured to give a mostly increasing gain verses frequency characteristic. This increasing gain verses frequency characteristic is achieved by using resistor/capacitor network as the gain-setting impedance. As the impedance of this network changes with frequency the gain of the amplifier changes. The component values and configuration of the gain network are chosen carefully so that as the gain of the amplifier is increased by the control voltage (305), the DC and AC signal losses are compensated together so that the picture brightness is restored at the point where the smudge is removed. The outputs from the fixed gain (303) and variable gain (304) amplifiers are added to produce the final compensated signals (306 to 308).

Signal 306 is a combination of the green colour signal and the vertical synchronisation (vsync) signal. These signals are separated into the green colour signal (310) and a fixed polarity vsync signal (311) by the vsync extraction circuit (309). This contains a diode that separates out the positive going video signal and an amplifier that detects transitions that cross a selected negative threshold voltage. The microprocessor (312) is regularly updated with information about the original vsync polarity by the computer-end micro (208). The original vsync polarity is signalled to the polarity restoration circuit (313) which uses an exclusive-OR logic gate to restore the original polarity and create the final vsync signal (314) that is sent to the monitor.

Signal 307 is a combination of the red colour signal, the horizontal synchronisation (hsync) signal and an audio signal. The hsync and red colour signals are separated using an hsync extraction circuit (315) that works in a similar way to the vsync extraction circuit (309). This produces a red colour signal (317) and a fixed polarity hsync signal (316). The original polarity of the hsync signal is restored by the polarity restoration circuit (318) which works in a similar way to the vsync polarity restoration circuit (313) to produce the final hsync signal (319) that is fed to the monitor. Combined signal 307 is also fed into audio extraction circuit 320. This circuit samples the level of the signal during the horizontal sync pulse and then uses a capacitor to hold the level at other times. The sampling is achieved using a switch that is switched on during the horizontal sync pulse and switched off at other times. An illustration of the resulting reconstituted audio signal (122) is shown in FIG. 4(*e*). The repeat rate of the horizontal sync pulses is fast enough to ensure that a reasonable quality audio signal is recovered.

Signal 308 is a combination of the blue colour signal, the hsync signal and an audio signal. The audio signal is reconstituted by circuit 321 using the same method as circuit 320. The blue video signal (323) is extracted using an hsync removal circuit (322) that utilises a diode to remove the hsync pulses.

The microprocessor assembly (312) mainly consists of an Arizona Microchip PIC16F877 micro together with some associated interfacing circuitry. This microcontroller contains integral flash program memory. It is programmed to implement PS/2 keyboard and mouse connections (124,125) and an RS232 connection (126). All these connections are bidirectional and are therefore able to transfer data in both directions. This two-way data flow is achieved on the PS/2 ports by a protocol that uses a clock and data signal, and on the RS232 ports by supporting separate transmit and receive signals. The microprocessor processes this data and is able to manipulate received data to generate new data, and send and receive data to and from the computer-end interface circuit (100) via twisted pair 203. To conform with certain timing requirements the microprocessor is able to generate data in response to certain data requests sent from the keyboard and mouse via the PS/2 connections (124,125) without transferring any data over twisted pair 203. Data received from twisted pair (203) via the cable interface circuit (324) and the data taxi circuit (325) is source identified so that the microprocessor (312) can process it and send it on to an appropriate device. The microprocessor is also able to exchange data with the USB host emulator circuit (326) thereby performing a conversion to and from USB format.

The microprocessor (312) monitors the data received from the keyboard (107) looking for a sequence of data that equates to a hotkey combination (for example ctrl+alt+C keys pressed together). When the hotkey sequence is detected the microprocessor stops sending keyboard data to the computer-end interface and implements a configuration mode whereby the keyboard cursor keys cause the pulse width of signal (329) to change. This change in pulse width is converted into a control voltage (305) by the control voltage generation circuit (327). This circuit (327) averages the value of the varying pulse width signal (329) using a capacitor to create the control voltage (305). Using this technique the microprocessor (312) is able to control the level of signal boost applied by the compensation circuits (300 to 302). When the correct level of compensation is achieved the user can press the keyboard return key and the microprocessor saves the selected compensation value in its EEPROM memory for future use.

To achieve the automatic compensation function, the microprocessor (312) outputs a control voltage to the resistance measurement circuit (330). This voltage is introduced onto the twisted pair wires (203) by a combination of resistors in the resistance measurement circuit (330). The twisted pair are terminated at the computer end by a known resistance. A standard resistance is provided at the peripheral end in series with the twisted pair. The current that flows is measured by the resistance measurement circuit (330) by measuring the voltage across the standard resistance and using a combination of resistors and amplifiers to produce a control voltage that is fed back to the microprocessor (312). The microprocessor then performs an analogue to digital conversion to create a data value that can be used to control signal 329 or not depending on whether the user has stored a manual compensation setting.

The interface between the data taxi (325) and the twisted pair wires 203 is achieved using a differential driver/receiver circuit (324) that contains a Maxim MAX481. The function of this data taxi circuit is to transfer data at high speed to and from the microprocessor (312) and the USB host emulator (326) and then deal with the detailed implementation of the serial data transfer protocol used to transfer data in both directions via twisted pair 203. This data taxi contains data buffering functions and is implemented with an Altera Flex 8000 series programmable logic device that is configured using a configuration EPROM.

The serial data transmission protocol used by the invention works on the basis that all data transfers are initiated by the user-end. The user-end sends a serial bit stream that contains information about the type of action required (send or receive). If the action is a send action then data is sent serially to the computer end. If the action is a receive action then the user-end switches into receive mode and receives a serial data stream from the computer-end. The user-end interface circuit (101) regularly polls the computer-end interface circuit (100) to ensure that data is received in a prompt manner. The data taxi circuit tags the data received from the USB host emulator (326) and the microprocessor (312) so that it can be separated out by the computer-end circuit.

The USB host emulator circuit (326) is constructed using two Cypress CY7C67113 USB mini host controllers together with some associated components. The CY7C67113 is a One Time Programmable (OTP) microcontoller with integrated USB mini host interface capabilities. Each CY7C67113 is used to host a single USB peripheral allowing the USB keyboard (110) and USB mouse (111) to be connected to the user-end interface circuit without the need to use a USB hub. Another way to configure the USB host emulator circuit would be to implement a USB host controller that supported multiple USB devices over a single USB connection, but as previously noted, this would require a USB hub to be used to connect both the keyboard and mouse. Such a circuit may be constructed using a ScanLogic Corporation SL811H USB Host/Slave Controller coupled together with an 8051 based microcontroller system, as provided by Philips Semiconductor, and associated logic. The CY7C67113 firmware is written so as to implement a pseudo USB connection for keyboards and mice when coupled with the circuitry within the computer-end circuit. The firmware can be changed to support different devices and more devices could be supported by using more CY7C67113s.

Finally the audio signal (128) from the microphone (112) is superimposed onto the digital data signal on wires 203 by the use of amplifiers in circuit 328. The audio signal is of sufficiently low amplitude not to affect the threshold detection of the digital signals at the computer-end and so both signals can be superimposed without problems.

If the length of the twisted pair interconnection cable (102) is shorter than about 75 meters then a good picture quality can usually be achieved using common Category 5 twisted pair cable. For longer distances and higher screen resolutions this type of cable can often create a propagation delay difference between the red, green and blue signals causing the colours to separate on the screen. The reason for this is that the individual twisted pairs that make up the cable are deliberately given different numbers of twists per meter to reduce the crosstalk between pairs. This creates a wire length difference between the pairs for a given overall cable length. This difference in wire length produces a propagation delay difference due to the differing distances that the various signals have to travel. This timing delay causes the red, green and blue colours on the video screen to start to separate causing coloured shadows at some colour transitions. This effect becomes more noticeable as the video resolution and the cable distance is increased.

Figures 5, 6:
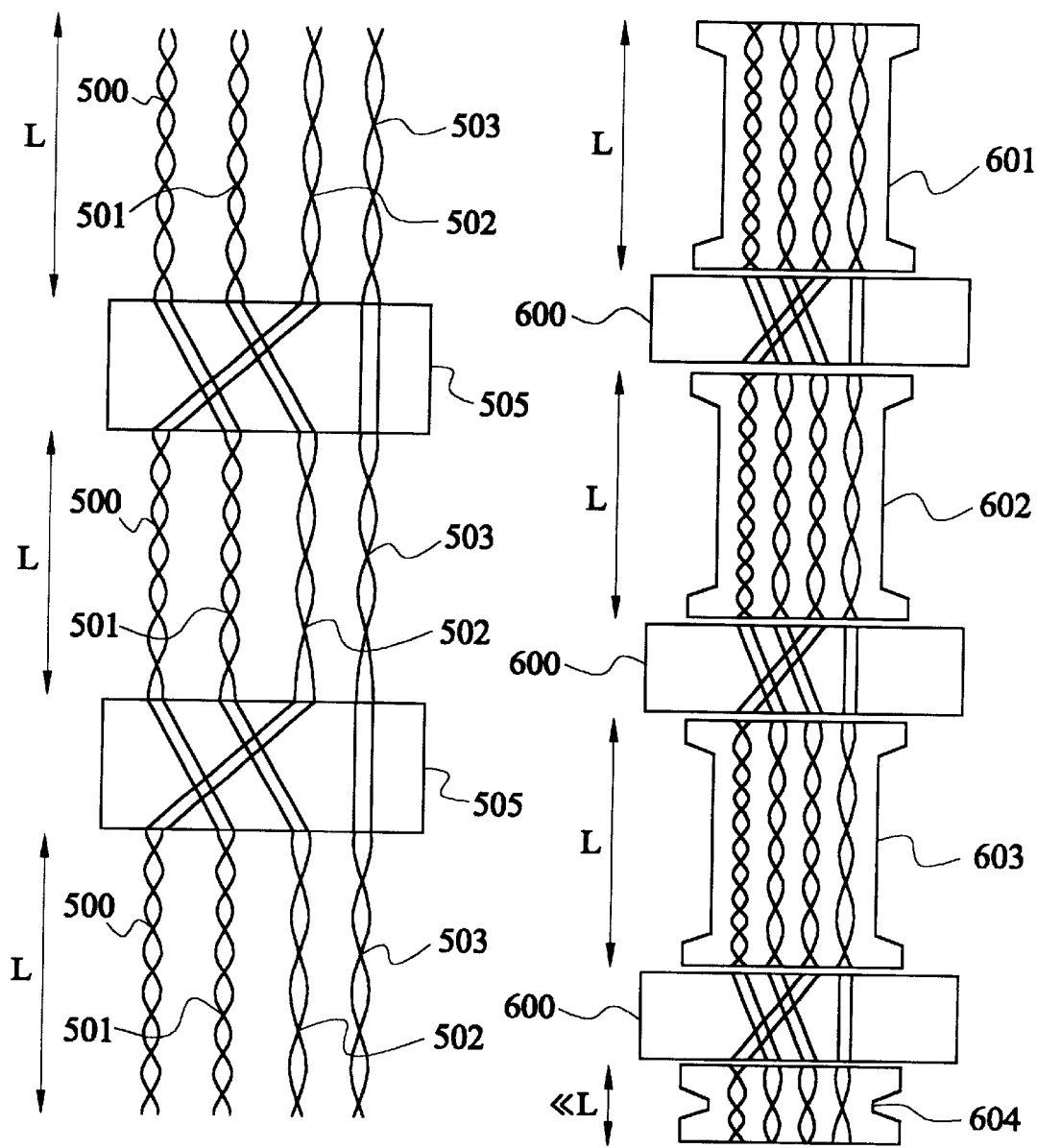
FIG. 5 illustrates a twisted pair cable according to an aspect of the invention.
FIG. 6 illustrates a further twisted pair cable according to an aspect of the invention.

To overcome this colour separation problem a hybrid cable is provided that can be constructed using three approximately equal lengths of common inexpensive twisted pair cable. The general construction of this cable is shown in FIG. 5. Each of the three segments is of length L and contains four twisted pairs of wires (500 to 503). Each of the segments is made out of the same type of cable and so equivalent twisted pairs within each segment have the same number of twists per meter. This type of cable usually has colour coded twisted pairs and so the equivalent pairs within each segment can be easily identified. Twisted pairs 500, 501 and 502 are used to carry the red, green and blue video colour signals. The segments are connected together by crossover nodes (504,505) so that the red, green and blue signals are re-routed at each node to use a different twisted pair. The complete cable is configured so that each of the red, green and blue colour signals are transmitted through an equal length of the three twisted pairs 500,501 and 502. The total wire length travelled by the red, green and blue signals is therefore the same thus removing any propagation delay differences and removing colour separation problems. The ends of the cable are terminated with RJ45 plugs, with the plugs being wired so that the same signals appear on the same connector pins at both ends of the cable. Twisted pair 503 is not used to carry a video colour component and so is wired straight through at each of the crossover nodes (504, 505).

For certain applications it may be advantageous to be able to plug together a number of cables to create the hybrid cable from an assembly of existing or commonly available cables. Many such cables are terminated at both ends with RJ45 plugs and wired on a straight through basis (pin 1 to pin 1, pin 2 to pin 2 etc.). Referring to FIG. 6, it can be seen that the hybrid cable can be plugged together using three such cables (601,602,603) of equal length (L) and a number of common junction boxes (600) that have two RJ45 socket connectors. A short length of RJ45 plug terminated straight through patch cable (604) can be plugged into the end junction box so that the same signals appear on the same connector pins at both ends of the assembled hybrid cable.

Figure 7:
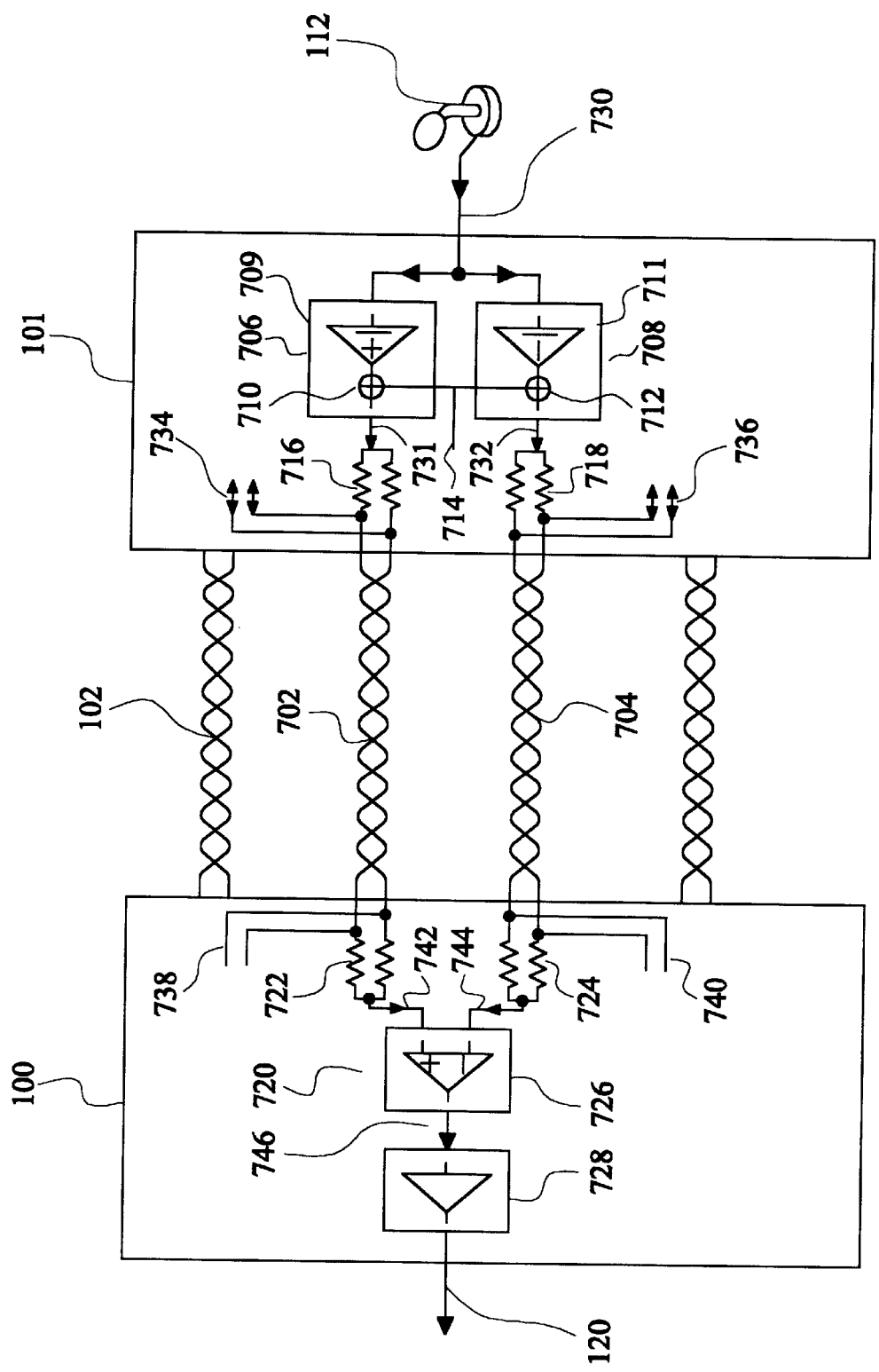
FIG. 7 shows a schematic block diagram illustrating a further audio data transfer part of the computer signal transmission system.

With reference to FIG. 7 there is shown apparatus for effecting the transfer of audio signals between the peripheral user-end and the computer-end. User end microphone (112) generates audio signals which are transmitted to the user-end interface circuit (101). The user end interface circuit is connected to the computer-end interface circuit (100) by a twisted pair cable including four twisted pairs. A first (702) of these twisted pairs carries video signals including the red video colour signal. A second (704) of these twisted pairs carries video signals including the blue video colour signal. The actual colour of the video colour signal is immaterial.

The user end interface circuit (101) includes a first audio signal conditioning circuit (706) and a second audio signal conditioning circuit (708) connected to the audio signal output from the microphone (112). The first audio signal conditioning circuit includes a unity gain amplifier (709) and an adding means (710). The second audio signal conditioning circuit includes a unity gain inverting amplifier (711) and an adding means (712). A reference voltage source (714) is provided in communication with the adding means of the first and second audio signal conditioning circuits. The output signal from the respective adding means is connected via first and second matched resistor pairs (716,718) to the red and blue video signal twisted wire pairs (702,704) respectively.

The computer-end interface includes an audio signal extraction circuit (720). First and second matched resistor pairs (722,724) are provided connected to the red and blue twisted wire pairs. The output signals from the matched resistor pairs are connected to a subtractor circuit (726). The output of the subtractor circuit is then fed to an amplifier (728) to provide a transmitted audio output signal to be supplied to the computer end audio device input.

The method of operation of the apparatus shown in FIG. 7 will now be described. The microphone audio signal (730) is transmitted between the user-end interface circuit (101) and the computer-end interface circuit (100) using a pair of common mode signals. It will be appreciated that transmission in the opposite direction can be realised by providing equivalent 'transmitting' and 'receiving' circuitry in the computer and peripheral interfaces respectively. The interface which transmits the signal can be considered a transmitting interface and the interface which receives the transmitted signal can be considered a receiving interface.

The ac-coupled audio signal (730) from the microphone (112) is fed into the first and second signal conditioning circuits (706) and (708). The first signal conditioning circuit (706) takes the ac-coupled audio signal A and adding means (710) references it to a reference voltage Vref to create a combined signal equal to (Vref+A) (731). The second signal conditioning circuit (708) inverts the audio signal A before adding means (712) references it to the reference voltage Vref. This circuit therefore creates an output signal voltage equal to (Vref−A) (732). The two resulting signals (731,732) are injected onto the red and blue twisted pair wires (702, 704) via matched resistor pairs (716,718) so that these common mode signals do not significantly affect the differential mode signals being detected by the rest of the circuit (734,736). This example uses the red and blue pairs to transfer the two common mode signals. However, the choice of these two pairs is not critical and another combination of pairs may equally well have been chosen.

On reaching the computer-end interface circuit (100) the common mode signals do not significantly affect the differential mode signalling on the red and blue pairs (738,740). The resistor pairs (722,724) extract the common mode signals from the red (702) and blue (704) pair respectively to create the transmitted noisy audio signals 742 and 744. On the assumption that the noise voltage (N) is induced equally onto both signals, which is an approximation to what is observed in practice. then transmitted noisy audio signals 742 and 744 will be equal to (Vref+A+N) and (Vref−A+N) respectively. These signals are fed into the subtractor circuit 726 which takes the difference between the two incoming signals to create the output transmitted audio signal 746. This difference output signal 746 is equal to 2A; i.e. ((Vref+A+N)−(Vref−A+N)) which is independent of the noise voltage N provided that the noise is induced substantially equally onto both pairs of conductors.

In practice the noise is not induced exactly equally but the levels are sufficiently similar to enable a reasonable quality audio signal to be transferred using this technique. The noise reduced output signal 746 is then fed into the amplifier circuit (728) to create the audio signal (120) that is sent to the computer.

Although the embodiment describes use of the apparatus and technique to transfer a microphone audio signal between two locations it will be appreciated that the same technique could be used to transfer other signals that would benefit from noise reduction but could not be transferred as differential mode signals due to a lack of available wires. Systems that transfer other signals using the same technique are considered to fall within the ambit of this aspect of the invention. It will also be appreciated that similar transmitting and receiving circuitry can be provided in the computer interface and user-end interface so as to provide transfer of signals in either direction.

What is claimed is:

1. A system for transmitting electrical signals between a computer and peripherals along a twisted pair cable, comprising:
   a computer interface;
   a multiplexer associated with the computer interface;
   a peripheral interface; and
   a twisted pair cable including a plurality of twisted pair lines, the twisted pair cable being in communication between the computer interface and the peripheral interface, in which a red, a green and a blue video colour signal, a horizontal and a vertical video syuchronisation signal and at least one audio signal from the computer are transmitted via three twisted pair lines of the cable to the peripherals via the peripheral interface, and in which the multiplexer multiplexes one of the video synchronization signals and either one of the video colour signals, or said at least one audio signal, for transmission via one of the three twisted pair lines.

2. A system as claimed in claim 1, in which a one of the video colour signals, a one of the video synchronisation signals and the audio signal are all transmitted via a one of the three twisted pair lines.

3. A system as claimed in claim 1, in which a second audio signal is also transmitted via a one of the three twisted pair lines of the cable.

4. A system as claimed in claim 1, in which peripheral signals are transmitted between the computer and peripherals via a fourth twisted pair line of the cable.

5. A system as claimed in claim 1, in which further audio signals are transmitted between the peripherals and the computer via a fourth twisted pair line of the cable.

6. A system as claimed in claim 1, in which:
   a first of the video colour signals and the vertical video synchronisation signal are transmitted along a first twisted pair line;
   a second of the video colour signals, the horizontal video synchronisation signal and a first audio signal are transmitted along a second twisted pair line; and
   a third of the video colour signals, the horizontal video synchronisation signal and a second audio signal are transmitted along a third twisted pair line.

7. A system as claimed in claim 1, in which the video signals provide a video input to a video display unit and the audio signal provides an audio input to an audio output device.

8. A system as claimed in claim 1, in which the multiplexer multiplexes one of the video colour signals and one of the video synchronisation signals for transmission by a twisted pair line.

9. A system as claimed in claim 1, in which the multiplexer multiplexes the audio signal and one of the video synchronisation signals for transmission by a twisted pair line.

10. A system as claimed in claim 9, and including a sampler which samples the audio signal to be multiplexed.

11. A system as claimed in claim 9, in which the multiplexer also multiplexes a video colour signal.

12. A system as claimed in claim 9, and including a second multiplexer which muliplexes a second audio signal and a one of the video synchronisation signals for transmission by a second twisted pair line.

13. Apparatus for transmitting a multiplexed video synchronisation signal and an audio signal from a computer to a video display unit and an audio output, comprising:
   a signal combiner which receives a video synchronisation signal from a video output of a computer;
   a sampler which samples the audio signal and communicates the sampled audio signal to the signal combiner;
   a twisted pair cable connected at a first end to the signal combiner; and
   a signal separator connected to a second end of the twisted pair cable, in which the signal combiner modulates the amplitude of the video synchronisation signal with the sampled audio signal and the signal separator provides separate transmitted video synchronisation and audio signals to the video display unit and the audio output respectively.

14. Apparatus as claimed in claim 13, in which video synchronisation signal is used to gate the sampling of the audio signal.

15. Apparatus as claimed in claim 13, in which the signal combiner also receives a video colour signal from the video output of the computer and the signal combiner periodically adds the amplitude modulated video synchronisation signal to the video colour signal when the video colour signal is inactive and the signal separator provides separate transmitted video colour and video synchronisation signals to the video display unit.

16. Apparatus as claimed in claim 13, in which the video synchronisation signal is a horizontal synchronisation signal.

17. Apparatus as claimed in claim 15, in which the video synchronisation signal and the video colour signal have opposite polarity.

18. Apparatus as claimed in claim 15, in which the added video synchronisation signal has negative polarity.

19. Apparatus as claimed in claim 13, and including a polarity detector and a polarity converter in communication with the signal combiner which detect the polarity of the video sychronisation signal received from the computer and transmit only a video synchronisation signal having a particular polarity to the signal combiner.

20. Apparatus as claimed in claim 19, and including a polarity restorer in communication with the signal separator which controls the polarity of the video synchronisation signal supplied to the video display unit to be appropriate for the video display unit.

21. Apparatus as claimed in claim 20, and including video synchronisation timing signal transmission means which transmits a timing signal derived from the polarity detector to the polarity restorer to coordinate the polarity of the video synchronisation signal supplied by the computer video output and the polarity of the video synchronisation signal supplied to the video display unit.

22. Apparatus as claimed in claim 13 and including an amplifier receiving the transmitted multiplexed signal and amplifying it to compensate for transmission degradation.

23. A system for transmitting electrical signals between a computer and peripherals along a twisted pair cable, comprising:
   a computer interface;
   a multiplexer associated with the computer interface
   a peripheral interface; and
   a twisted pair cable in communication between the computer interface and the peripheral interface, in which said multiplexer multiplexes a video synchronisation signal and either a video colour signal or an audio signal from the computer so that the video synchronisation signal, the video color signal and the audio signal are transmitted via a single twisted pair line of the twisted pair cable to the peripherals.

24. A system as claimed in claim 23, in which the audio signal is encoded by the video synchronisation signal.

25. A system as claimed in claim 24, in which the audio signal is encoded by amplitude modulation of the video synchorisation signal.

26. A system as claimed in claim 25, in which the video synchronisation signal is a horizontal video synchronisation signal.

27. A method for transmitting electrical signals between a computer interface and a peripheral interface, comprising:
   providing a twisted pair cable connected between the computer interface and the peripheral interface, the twisted pair cable including a plurality of twisted pair lines;
   multiplexing a horizontal or a vertical synchronization signal and either a red, green or blue video colour signal or at least one audio signal; and
   transmitting the red, green and blue video colour signals, the horizontal and a vertical video synchronisation signals and the audio signal from the computer interface to the peripheral interface via three twisted pair lines of the cable.

28. A method for transmitting electrical signals between a computer interface and a peripheral interface, comprising:
   providing a twisted pair cable connected between the computer interface and the peripheral interface;
   multiplexing a video synchronisation signal and either a video colour signal or an audio signal and
   transmitting the video colour signal, the video synchronisation signal and the audio signal from the computer interface to the peripheral interface via a single twisted pair line of the cable.

* * * * *